US005897693A

United States Patent [19]

Whitehead

[11] Patent Number: 5,897,693
[45] Date of Patent: Apr. 27, 1999

[54] FREE-FLOWABLE POWDER LITHOGRAPHIC FOUNTAIN SOLUTION CONCENTRATE AND METHOD OF USE

[75] Inventor: James K. Whitehead, Winfield, Ill.

[73] Assignee: Fuji Hunt Photographic Chemicals, Inc., Paramus, N.J.

[21] Appl. No.: 08/872,102

[22] Filed: Jun. 10, 1997

[51] Int. Cl.[6] ...... C09K 3/00

[52] U.S. Cl. ...... 106/2; 101/451

[58] Field of Search ...... 106/2; 101/451

[56] References Cited

U.S. PATENT DOCUMENTS 4,187,029 2/1980 Canale et al. ...... 366/153
4,234,443 11/1980 Canale et al. ...... 252/135
4,340,509 7/1982 Canale et al. ...... 252/529
4,374,036 2/1983 Canale et al. ...... 252/135
5,282,892 2/1994 Laufs ...... 106/2

*Primary Examiner*—Melissa Koslow
*Attorney, Agent, or Firm*—Burns, Doane, Swecker & Mathis, L.L.P.

[57] ABSTRACT

A free-flowing powder fountain solution concentrate for use in lithographic printing is provided which comprises at least one of a solid ammonium or alkali metal phosphate, a solid polysaccharide, and a preservative The powder concentrate's components have uniformly high water dissolution rate as a blend, producing liquid concentrates in excess of 0.7 lbs/gallon of water for ease of use without the need for constant recirculation during storage. A process for preparing a liquid fountain solution concentrate in excess of 0.7 lbs/gallon of water is also provided whereby a premeasured quantity of the powder concentrate is packaged in a moisture proof package to preserve the powder's free flowability prior to use, and prevent exposure to irritating chemical dust during use.

8 Claims, 1 Drawing Sheet

FREE-FLOWABLE POWDER LITHOGRAPHIC FOUNTAIN SOLUTION CONCENTRATE AND METHOD OF USE

FIELD OF THE INVENTION

This invention relates to a free-flowing powder lithographic fountain solution concentrate and a method of preparing a liquid lithographic fountain solution concentrate, in particular though not exclusively, characterized by supplying a premeasured, stable, free-flowing, powdered, fountain solution concentrate to a mixing device capable of precisely admitting a predetermined quantity of water, and rapidly and reproducibly dissolving the powder to prepare a liquid fountain solution concentrate. The liquid concentrate thus produced may be immediately conveyed to a dilution device for distribution to a printing press, or stored for later use as needed. The method also comprises a moisture proof storage means for maintaining the powdered fountain solution concentrate in a free-flowing state, and a mixing device for precisely admitting a predetermined quantity of water to dissolve the powder, and dispensing a liquid concentrate and the like.

BACKGROUND OF THE INVENTION

Fountain solutions are used in the lithographic printing process to clean the surface of the lithographic printing plate, to replenish the desensitized area of the printing plate, and to continuously maintain the non-printing area of such plates water receptive or hydrophilic. Conventional liquid fountain solution concentrates are normally used but suffer from the disadvantage of being supplied in heavy drums. Alkaline and neutral dry powder formulations have been disclosed for use in lithographic printing of newspapers, magazines, and the like by Canale U.S. Pat. No. 4,187,029; 4,234,443; 4,340,509; and 4,374,036 which purport to allay the disadvantages of using liquid concentrates. Canale (U.S. Pat. No. 4,374,036) discloses a neutral dry powder fountain solution concentrate containing the following ingredients (all ingredients are solids unless where specified otherwise): tetrapotassium pyrophosphate, monosodium phosphate, tetrasodium EDTA, a sodium carboxymethyl cellulose, a water soluble polyethylene glycol, liquid silicone defoaming agents, liquid nonionic and anionic surfactants (e.g. Triton CF-32 and H-55 surfactants respectively), and Dowicil 75 biocide. This powder concentrate is typically dissolved in water in a ratio of about 27 lbs to 55 gallons of water to prepare a liquid fountain solution concentrate. The resulting concentrate is further diluted with water to prepare a press ready liquid fountain solution. Furthermore, Canale discloses an apparatus (U.S. Pat. No. 4,187,029) for dissolving a dry powder formulation with a predetermined amount of water, which also serves to maintain the solubility of the ingredients having different solubility characteristics by continuously recirculating the solution.

Ideally, a powdered fountain solution concentrate should be stable and free-flowing to facilitate transferring it to the mixer. Unfortunately, the above mentioned prior art compositions have a propensity to clump if either compressed, stored above 72° F., or exposed to humid air, due in part to the following: 1) the presence of several liquid components in the formulation, 2) the presence of waxy or gummy polyethylene glycols in excess of 0.5% w/w in concentration, and 3) the absence of precautions to protect the formulation from high humidity conditions. All of these deleterious characteristics combine to make the use of this composition particularly disadvantageous. The manual addition of powder into the mixer may also cause spillage and worker exposure to irritating chemicals. Furthermore, practical difficulties are encountered in using the prior art powder concentrates because of the requirement of continuous recirculation to maintain its stability, and the apparent inability to prepare a highly concentrated fountain solution in excess of 0.7 lbs/gal.

SUMMARY OF THE INVENTION

In accordance with the invention, a free-flowing powder fountain solution concentrate is provided which contains components which all dissolve in water at substantially the same rate when added to the water as a blend. This composition therefore allows the prompt use of a freshly prepared liquid fountain solution concentrate and assures that all components will remain dissolved during use without the need for continuous recirculating from a central mixing station. Another feature of the invention is the ability to prepare highly concentrated liquid fountain solutions, i.e. in excess of 0.7 lbs/gal., from the powder fountain solution concentrate composition. This feature allows the press operator more latitude to adjust the final dilution of the liquid fountain solution concentrate to satisfy the diverse production requirements for such processes as heat-set and nonheat-set web printing and sheet fed printing. In accordance with the present invention, the preparation of a highly concentrated liquid fountain solution with components which all dissolve in water at substantially the same rate when added together as a blend is therefore defined as 1) adding in excess of 0.7 lbs./gal. Of the powdered concentrate to water within a temperature range of 40° F. to 80° F. and 2) mixing with a suitable agitation means, e.g. a blade mixer or the like, for a maximum of 30 minutes after which time complete dissolution of the powder concentrate has been achieved and a clear solution has been produced.

Another feature of the invention is the resistance of the free-flowable powder concentrate to clumping due to both compression arising from the pressure of adjacent packages during shipment, storage above a temperature of 72° F., and rapid uptake of moisture from humid air. This feature allows the contents of the inventive package containing the powder concentrate to be easily dissolved in water due to the stable, finely divided state of the powder concentrate and the absence of clumps therein.

Another feature of the invention is the moisture proof storage means used to store a predetermined quantity of the powder fountain solution concentrate and maintain its free-flowing nature over extended periods of time and under adverse conditions of humidity. This feature also allows the transport and storage of conveniently sized packages which have excellent shelf life and lack the disadvantages of bulky liquid concentrates.

Typically a mixing apparatus will receive the entire contents of the premeasured powder without exposing the user to irritating chemical dust, and accurately dissolve the powder in a predetermined quantity of water. After a short mixing time, the contents of the mixer may be conveyed to a dilution device connected directly to the printing press or stored in a reservoir for later use. The invention thus affords the combined advantages of convenient, long term storage of powdered fountain solution concentrates in a free-flowing state, preparation and use of a stable liquid fountain solution concentrate, ease of handling, extended latitude of use, and reduced worker exposure to irritating dusts.

Preferred embodiments of the invention will be described below, in the context of making the free-flowing powdered fountain solution concentrate, and the method of its use, with reference to the accompanying drawing.

BRIEF DESCRIPTION OF THE DRAWING

The drawing is a diagram of a suitable apparatus for mixing and dispensing a liquid fountain solution concentrate in accordance with the invention.

DESCRIPTION OF PREFERRED EMBODIMENTS OF THE INVENTION

Figure 1:
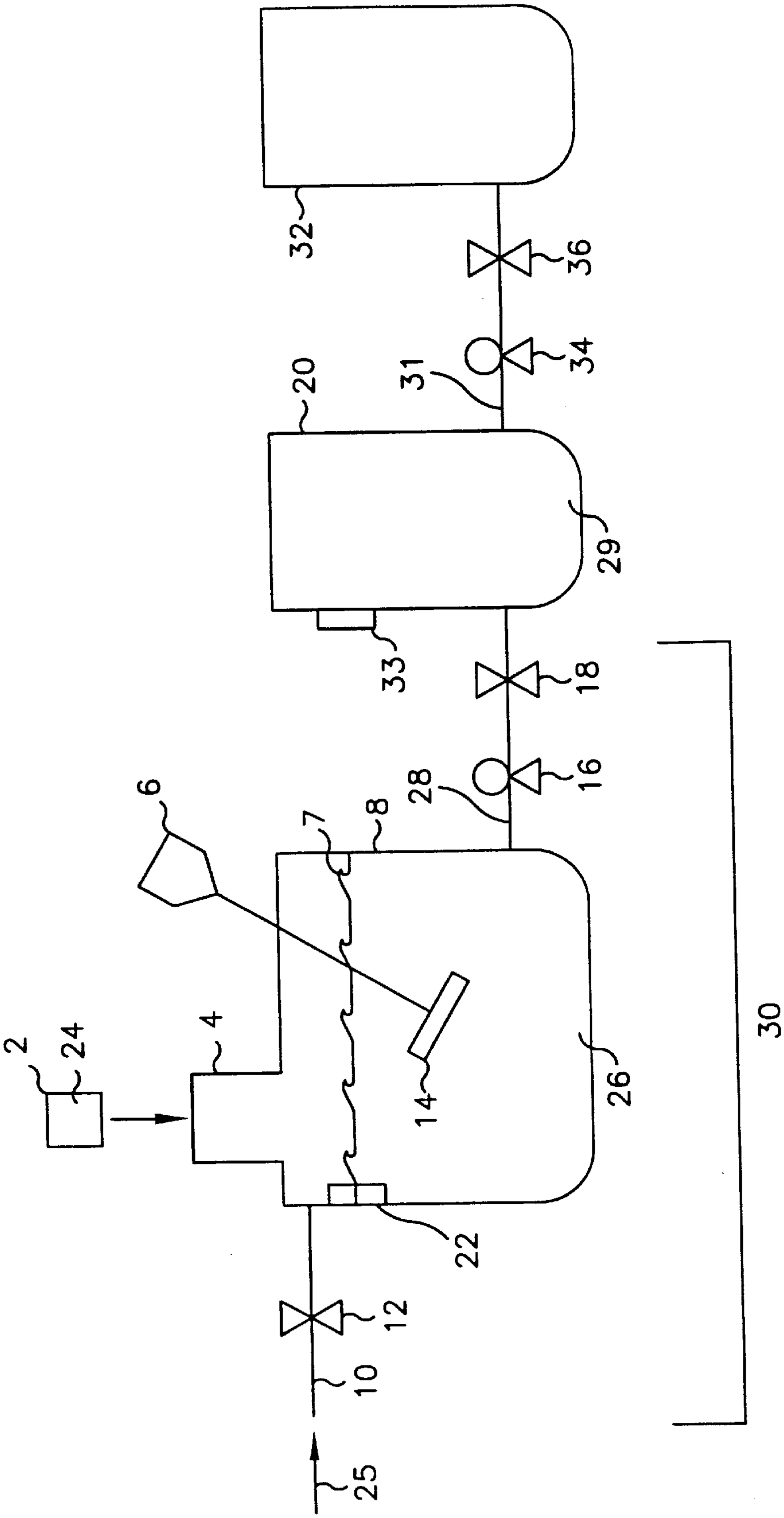

Referring now to the drawing, the drawing shows a suitable apparatus which overcomes the inadequacies of the prior art when used in accordance with the invention. A package or vacuum sealed pouch 2 can be made of any moisture resistant material with sufficient physical properties to withstand the ordinary stresses of handling and shipping. Packaging materials may include plastics such as polyethylene, polyethyleneterephthalate, etc., or metallic foils such as aluminum, or laminates thereof, and the like. Free-flowing powder lithographic fountain solution concentrate is contained within vacuum sealed pouch 2, and is transferred to mixing tank 8 by way of receiving port 4. Receiving port 4 may be a simple conduit for allowing pouch 2 to be inserted into mixing tank 8 or it can be an automatic means for holding and delivering the contents of one or more pouches 2 on demand or at predetermined time intervals. Receiving port 4 is attached to and situated above the liquid level 7 of mixing tank 8. Mixing tank 8 can be made of any suitable material commonly used to contain lithographic fountain solutions e.g. plastic, metals glassy or composite materials and the like. Water 25 is delivered to mixing tank 8 via inlet conduit 10 and through valve 12. Level sensing device 22 detects when the desired fill volume of mixing tank 8 has been attained and closes valve 12 to stop further water flow. Level sensing device 22 may operate by any suitable mode to detect water level such as by conductivity, optical detections or the physical displacement of a float, and the like. The water 25 and powder fountain solution concentrate 24 are mixed by mixer blade 14 driven by mixer motor 6 until the powder concentrate 24 has become completely dissolved, typically after approximately 20 to 30 minutes of mixing depending on the temperature of the water 25 used to make the liquid fountain solution concentrate 26. Alternatively, any suitable agitation means may be used in place of mixer blade 14 and mixer motor 6 to effect the dissolution of the powder concentrate 24, e.g. pumping or shaking the contents of mixing tank 8, and the like. After dissolution is complete, the liquid fountain solution concentrate 26 is pumped directly to printing press dilution device 20 via conduit 28 and valve 18 by pump 16.

Mixing station 30 consists of mixing tank 8, mixer motor 6, mixer blade 14, level sensor 22, receiving port 4, inlet conduit 10, outlet conduit 28, pump 16, and valves 12 and 18. The printing press dilution device or dilutor 20 may be separated and independent from the printing press 32, or constitute an integral part of the press 32. Typically the dilutor 20 will reduce the concentration of the liquid fountain solution concentrate to approximately 1.5% weight/volume for direct use in lithographic printing. If dilutor 20 is separated from the printing press 32, the working fountain solution 29 is next pumped to press 32 through conduit 31 and valve 36 by pump 34. Optionally sensor 33 may be integrated within either the dilutor 20 or printing press 32 to monitor the quality of the fountain solution working solution 29, such as by monitoring its conductivity or pH and the like. It is known that certain components of a fountain solution 29 will be consumed in a disproportionate manner eventually causing print quality problems such as toning and scumming unless periodically replenished by fresh fountain solution 29. In one embodiment the sensor 33 may be configured to sense a change in conductivity of the fountain solution 29 after a period of use, and in response, cause additional fresh liquid fountain solution concentrate 26 to be dispensed by mixing station 30 to press 32 in a predetermined manner, thereby maintaining the printing performance of press 32.

With the foregoing in view, there is provided in accordance with the invention, a free-flowing powder lithographic fountain solution concentrate comprising:

a. 50–75% by weight of at least one of a solid ammonium or alkali metal phosphate;

b. 2–20% by weight of a solid polysaccharide, and c. 1–10% by weight of a preservative wherein said concentrate being composed of components all having substantially the same dissolved in water to form a liquid fountain solution concentrate in excess of 0.7 lbs./gal of water in concentration.

Typically the ammonium or alkali metal phosphates, polysaccharides, and preservatives are commercially available in powder form in a range of particle sizes. It has been found that the particle diameter of these raw materials is not critical since the powders become intimately blended using a Littleford blender, ribbon blender, other suitable blender or any suitable device during the course of formulating the powder concentrate. Particle fines will therefore tend to agglomerate forming larger particles, and course particles will tend to break down to smaller ones, in the course of the blending.

In addition, the typical neutral fountain solution will contain other ingredients such as sequestering agents to prevent precipitation due to the use of tap water containing calcium, magnesium, iron, etc. (e.g. EDTA, gluconate, citrate, etc), anticorrosive agents to inhibit corrosion of the printing plate and printing press (e.g. sodium nitrate, tolyltriazole, etc.), and a nonionic surfactant to enhance the wetting of the printing plate etc.

Polysaccharides which are used in the invention are selected from compounds, or mixtures thereof, which are combinations of nine or more monosaccharides, linked together by glycosidic bonds. In addition, the polysaccharide selected must have the required dissolution rate in water to produce a clear solution when blended with the other fountain solution components as defined above. Suitable polysaccharides are commercially available and include cellulose and cellulosic derivatives such as carboxymethylcellulose.

In the case of the nonionic surfactant, any low foaming nonionic surfactant with an HLB between 3 and 18 may be used. Suitable candidates include ethoxylated and propoxylated alcohols or alkyl phenols such as Anatarox BL-225, BL-240, BL-344, and LA-EP 45 (available from Rhone-Poulenc); Chemal DA-6, LF-25B, LF-403, LFL-19 (available from Chemax, Inc.); Makon NF-5 and NF-12 (available from Stepan Co.); Plurafac RA-30, and RA-40 (available from BASF Corp.); Poly-Tergent S-405LF (available from Olin Corp.); Cedepal CO-430, CO-530, and CO-630 (available from Stepan Canada Inc.); and Triton X-114 from Union Carbide Corp.). Other suitable nonionic surfactants include ethylene/propylene oxide block polymers such as Anatarox L 62 LF, L 64, and 17-R-2 (available from Rhone-Poulenc), Pluronic L-43, L-44, and L-62LF (available from BASF Corp.). Ethoxylated tetramethyl decynediols such as Surfynol 420, 440, 465, and 485 (available from Air Products & Chemicals, Inc.); and silicone based surfactants such as Silwet 720, 7607, and 7002 (available from OS Specialties, Inc.) may also be used as suitable nonionic surfactants.

Preferably the powder fountain solution concentrate contains (parts are by weight unless otherwise specified) 55–70% of at least one of a solid ammonium or alkali metal phosphate, 5–10% of a solid polysaccharide; and 1–5% of a preservative. More preferably, ammonium phosphate is present in the 10 to 20% range. Most preferably, the powder fountain solution concentrate contains 25–35% of sodium hexametaphosphate, 10–20% of ammonium phosphate, 5–10% of potassium phosphate, 5–10% of carboxymethylcellulose, 10–20% of sequestering agents, 1–5% of a nonionic surfactant, and 1–5% of a biocide preservative.

Preferably the powder fountain solution concentrate contains less than 0.5% by weight of a polyethylene glycol. Most preferably the powder concentrate contains substantially no polyethylene glycols.

Preferably the powder fountain solution concentrate is composed of components all having substantially the same dissolution rate in water to form a liquid fountain solution concentrate in excess of 0.8 lbs./gal. of water in concentration. Most preferably the powder fountain solution concentrate is composed of components having substantially the same dissolution rate in water to form a liquid fountain solution concentrate in excess of 0.9 lbs./gal of water in concentration.

Other suitable solid phosphates, sequestering agents, carboxymethyl cellulose compounds, and nonionic surfactants which may be advantageously used in the present invention are disclosed in U.S. Pat. Nos. 4,234,443; 4,374,036 and 5,282,892; the disclosures of which are incorporated herein by reference. The invention is further illustrated by the following example. Parts are by weight unless otherwise specified. All components are solids unless indicated otherwise.

EXAMPLE

A neutral powder lithographic fountain solution was prepared as follows: 7.6 pounds of Amber Gum 1221 (a solid polysaccharide commercially available from Aqualon division of Hercules Inc.) 7.6 pounds of sodium nitrate, 30.3 pounds of sodium hexametaphosphate, 15.1 pounds of diammonium phosphate, 7.6 pounds of monopotassium phosphate, 8.3 pounds of ammonium citrate, 10.9 pounds of dipotassium phosphate, 7.3 pounds of sodium gluconate, 3.5 pounds of Dowicil 75 biocide (commercially available from Ashland Chemical CO.), and lastly 1.8 pounds of liquid Pluronic L31 nonionic surfactant (commercially available from Joseph Turner & Co.) was blended using either a Aaron Equipment ribbon blender or a Littleford FM-130D blender. Component quantities were variously scaled up to produce 240 lbs. of finished free-flowing powder fountain solution concentrate using the Littleford blender and 1200 lbs. of finished free-flowing powder concentrate using the Aaron Equipment blender.

A stable, clear liquid concentrate fountain solution was prepared by dissolving 30 lbs. of the powder concentrate in 120 liters of water for 20 to 30 minutes using the mixer illustrated in the drawing. The liquid concentrate thus prepared had a concentration of 0.98 lbs./gal. and was further diluted to 1.5% weight/volume to make a press ready fountain solution for use with a Goss metro News Paper Press with a brush/flicker blade arch Goss dampening system. A Baldwin 270 NP Automixer was used to dilute the liquid fountain solution concentrate and feed press ready fountain solution to the press recirculation tanks. The pH of the press ready fountain solution was 7.2 to 7.4 and its conductivity was 1400 micromhos. Excellent paper clean-up reduced water spotting, minimal ink rub off from the printed sheets, and the need to maintain relatively low levels of water and ink were noted.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

I claim:

1. A free-flowing powder lithographic fountain solution concentrate comprising:

50–75% by weight of at least one of a solid ammonium or alkali metal phosphate;

2–20% by weight of a solid polysaccharide; and

1–10% by weight of a preservative;

wherein said concentrate is composed of components all having substantially the same dissolution rate in water when blended together, said concentrate forming a liquid fountain solution concentrate in excess of 0.7 lbs./gal. of water in concentration.

2. The powder fountain solution concentrate as recited in claim 1 comprising: 55–70% by weight of at least one of a solid ammonium or alkali metal phosphate, 5–10% by weight of a solid polysaccharide; and 1–5% by weight of a preservative.

3. The powder fountain solution concentrate as recited in claim 1, comprising 25–35% by weight of sodium hexametaphosphate, 10–20% by weight of ammonium phosphate, 5–10% by weight of potassium phosphate, 5–10% by weight of carboxymethylcellulose, 10–20% by weight of sequestering agents, 1–5% by weight of a nonionic surfactant, and 1–5% by weight of a biocide preservative.

4. A process for preparing a fountain solution for lithographic printing, comprising:

providing a quantity of a powdered fountain solution concentrate in a moisture proof package, and dissolving completely said powdered concentrate in water at a temperature of between 40° F. and 80° F. and a mixing time of 30 minutes or less to form a concentrated liquid fountain solution, said solution having a concentration in excess of 0.7 lbs./gallon of liquid.

5. The process as recited in claim 4 wherein the powdered fountain solution concentrate is packaged in a vacuum sealed package.

6. A free-flowing powder lithographic fountain solution concentrate, substantially free of polyethylene glycols, comprising:

50–75% by weight of at least one of a solid ammonium or alkali metal phosphate;

2–20% by weight of a solid polysaccharide; and

1–10% by weight of a preservative.

7. A process for preparing a fountain solution for lithographic printing, comprising:

providing a quanity of a powdered fountain solution concentration in a moisture proof of package, dissolving said powdered concentrate in water to form a concentrated liquid fountain solution, said solution having a concentration of said powdered concentration in excess of 0.7 lbs./gallon of liquid, wherein said powdered fountain concentrate comprises:

50–75% by weight of at least one of a solid ammonium or alkali metal phosphate;

2–20% by weight of a solid polysaccharide; and

1–10% by weight of a preservative.

8. The process as recited in claim 7 wherein said powdered fountain solution concentrate comprises 25–35% by weight of sodium hexametaphosphate, 10–20% by weight of ammonium phosphate, 5–10% by weight of potassium phosphate, 5–10% by weight of carboxymethylcellulose, 10–20% by weight of sequestering agents, 1–5% by weight of a nonionic surfactant, and 1–5% by weight of a biocide preservative.

* * * * *